J. L. Whipple,
Spring Seat.
No. 3,664. Reissued Oct. 5. 1869.
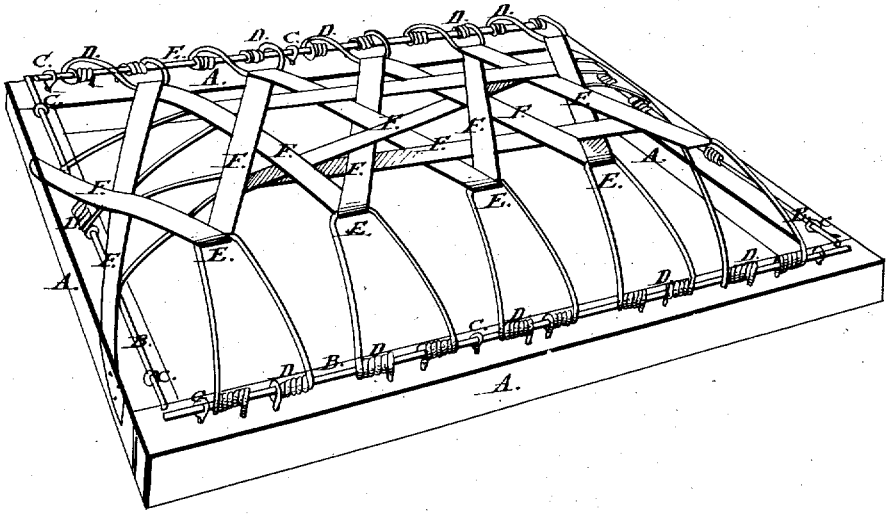
WITNESSES;
H. F. Eberth
Jas. I. Day.
INVENTOR:
John L. Whipple
Per
Thos. S. Sprague
attorneys.

United States Patent Office.

JOHN L. WHIPPLE, OF DETROIT, MICHIGAN.

*Letters Patent No.* 78,705, *June* 9, 1868; *reissue No.* 3,664, *dated October* 5, 1869.

IMPROVED SPRING-SEAT.

The Schedule referred to in these Letters Patent and making part of the same.

*To whom it may concern:*

Be it known, that JOHN L. WHIPPLE, of the city of Detroit, in the county of Wayne, and State of Michigan, did invent a new and useful Improvement in Spring-Seats, and obtained Letters Patent therefor, which patent was dated June 9, 1868; and we, THE WHIPPLE MANUFACTURING COMPANY, of Detroit, aforesaid, are the sole owners, by assignment, of the entire property and interest in said patent; and we do hereby declare that the following is a full and exact description thereof, reference being had to the accompanying drawings, and to the letters of reference marked thereon, and making a part of this specification.

The object of this invention is to so construct a spring-seat that it will accomplish all the desired ends secured in a seat composed of upright double-spiral or volute springs, without their attendant expense.

In the drawings—

A represents a proper frame, surmounted by the rods B, which are held in position by ring-staples C, eye-bolts, or other suitable devices.

Arranged at suitable intervals on the bars or rods B are the double-coil springs D, whose ends are secured to the upper sides of the frame A, and whose "bights" or loops E curve upward and inward, and are in position to receive the straps or webbing F, which is woven backward and forward, in and out of the "bights" or loops E, thereby forming an easy, elastic cushion, when covered with any suitable material, and adapted to any style of seat, and, when constructed of any proper dimensions, a luxurious and cheap bed-spring.

What is claimed as new, and desired to be secured by Letters Patent, is—

In combination with any suitable frame, A, the series of coil springs D, with loops or bights pointing inwardly, and connected by interlaced webbing or straps, substantially as and for the purposes set forth.

J. L. WHIPPLE,
WHIPPLE MANUFACTURING CO.,
By E. TROWBRIDGE, *Treas.*

Witnesses:
H. F. EBERTS,
JAS. I. DAY.